United States Patent
Akhoury et al.

(10) Patent No.: US 11,489,686 B2
(45) Date of Patent: Nov. 1, 2022

(54) VIRTUAL MEETINGS IN AD-HOC NETWORKS

(71) Applicant: Citrix Systems, Inc., Fort Lauderdale, FL (US)

(72) Inventors: Arnav Akhoury, Bangalore (IN); Satish Vanahalli, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 85 days.

(21) Appl. No.: 16/742,250

(22) Filed: Jan. 14, 2020

(65) Prior Publication Data

US 2021/0218590 A1 Jul. 15, 2021

(51) Int. Cl.
*H04L 12/18* (2006.01)
*H04W 84/18* (2009.01)

(52) U.S. Cl.
CPC ...... *H04L 12/1827* (2013.01); *H04L 12/1818* (2013.01); *H04L 12/1831* (2013.01); *H04W 84/18* (2013.01)

(58) Field of Classification Search
CPC ... H04L 65/1093; H04L 63/04; G06F 3/1454; G06F 15/16; H04W 4/08
See application file for complete search history.

(56) References Cited

U.S. PATENT DOCUMENTS

| | | | |
|---|---|---|---|
| 9,973,543 B2 * | 5/2018 | Chitroda | H04L 65/1094 |
| 10,362,452 B2 | 7/2019 | Chaki et al. | |
| 10,530,856 B2 | 1/2020 | Verma et al. | |
| 10,567,479 B2 | 2/2020 | Tal et al. | |
| 2010/0251142 A1 * | 9/2010 | Geppert | H04L 12/1822 715/758 |
| 2011/0235561 A1 * | 9/2011 | Liu | H04L 41/30 370/328 |
| 2013/0110920 A1 * | 5/2013 | Broustis | H04L 63/04 709/204 |
| 2014/0098956 A1 * | 4/2014 | Hansen | H04W 12/03 380/270 |
| 2014/0156854 A1 * | 6/2014 | Gaetano, Jr. | H04L 65/1093 709/227 |
| 2015/0289295 A1 | 10/2015 | Granbery | |
| 2015/0296004 A1 | 10/2015 | Goel et al. | |
| 2015/0304391 A1 | 10/2015 | Yu et al. | |
| 2015/0350267 A1 * | 12/2015 | Cutler | H04L 65/1093 709/204 |
| 2016/0021007 A1 | 1/2016 | Shuman et al. | |
| 2016/0065571 A1 | 3/2016 | Hoyos et al. | |

(Continued)

*Primary Examiner* — Mahran Y Abu Roumi
(74) *Attorney, Agent, or Firm* — Banner & Witcoff, Ltd.

(57) ABSTRACT

Methods and systems for conducting virtual meetings are described herein. A host device configured to host a virtual meeting and one or more user devices may receive information used to set up a virtual meeting from a computing device. The host device may establish a network a user device may connect to for participating in the virtual meeting. The one or more user devices may be directly connected to the host device so that data for the virtual meeting need only travel directly between the one or more user devices and the host device with no intermediary devices. Host responsibilities may be transferred from the host device to one of the user devices. If the host device becomes unresponsive, the computing device may perform actions to allow the user devices to continue the virtual meeting.

20 Claims, 7 Drawing Sheets

(56) References Cited

U.S. PATENT DOCUMENTS

| | | | |
|---|---|---|---|
| 2016/0105472 A1* | 4/2016 | Chitroda | H04L 65/1083 |
| | | | 709/204 |
| 2016/0308843 A1 | 10/2016 | Cassel | |
| 2017/0063566 A1 | 3/2017 | Seminario et al. | |
| 2017/0195386 A1 | 7/2017 | Nathan et al. | |
| 2017/0230453 A1 | 8/2017 | Verma et al. | |
| 2018/0103074 A1* | 4/2018 | Rosenberg | G06F 3/0482 |
| 2018/0176845 A1 | 6/2018 | Visuri et al. | |
| 2018/0270277 A1* | 9/2018 | Blanchard | H04L 12/1822 |
| 2018/0343547 A1* | 11/2018 | Chaki | H04W 8/005 |
| 2018/0367597 A1 | 12/2018 | Kolli | |
| 2020/0053072 A1 | 2/2020 | Glozman et al. | |
| 2020/0351095 A1* | 11/2020 | Yadav | G06Q 20/40145 |

* cited by examiner

US 11,489,686 B2

VIRTUAL MEETINGS IN AD-HOC NETWORKS

FIELD

Aspects described herein generally relate to computer networking and communication. More specifically, one or more aspects described herein provide a method for conducting a virtual meeting using a network.

BACKGROUND

Currently, an Internet connection is required to have a virtual meeting with people that are nearby, and data shared between participants in the virtual meeting may travel over network infrastructure that makes up the Internet. Virtual meeting data may undesirably consume Internet bandwidth because it may travel from a sending device participating in the virtual meeting to an online server and the server may send the virtual meeting data to the receiving device which may be near the sending device.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards conducting virtual meetings using a plurality of devices. A host device configured to host a virtual meeting may receive information used to set up the virtual meeting from a computing device (e.g., a server). One or more user devices may receive information from the computing device to enable them to join the virtual meeting. The host device may establish a network (e.g., an ad-hoc network) that one or more user devices may join to participate in the virtual meeting. The one or more user devices may be directly connected to the host device so that data for the virtual meeting need only travel directly between the one or more user devices and the host device with no intermediary device or server (except any needed network transmission nodes). The host device may relay virtual meeting data among the one or more user devices that are participating in the virtual meeting. The host device may also split meeting recording responsibilities among the participating user devices to allow redundant recordings and/or to spread the burden of recording among multiple devices.

During a virtual meeting, host responsibilities may be transferred from the host device to one of the user devices participating in the virtual meeting. The host device may choose one of the user devices to become the new host. If the host device becomes unresponsive, a computing device (e.g., a server) may choose a new host device from the user devices and may send meeting information necessary to continue the virtual meeting to the new host device and user devices participating in the virtual meeting. Additionally/alternatively, secondary hosts may be determined prior to starting the virtual meeting to become the new host device if the original host device becomes unresponsive.

In one aspect, a computer implemented method may include receiving, by a host device and from a computing device, virtual meeting setup information comprising a meeting identification (ID) corresponding to a virtual meeting hosted by the host device; sending, by the host device via a first network and to a user device, the meeting ID; establishing an ad-hoc network comprising the host device and the user device, wherein the user device is directly connected to the host device; and adding, based on a determination that the user device has access to the meeting ID, the user device to the virtual meeting hosted by the host device.

The method may further include sharing, by the host device, virtual meeting data with the user device via the ad-hoc network, wherein the virtual meeting data travels directly from the host device to the user device. The virtual meeting setup information may include a first token and the method may further include validating, based on a comparison of the first token and a second token received from the user device, the user device prior to adding the user device to the virtual meeting. Establishing the ad-hoc network may include broadcasting the ad-hoc network; and after adding the user device to the virtual meeting, ceasing to broadcast the ad-hoc network.

The method may further include receiving, by the host device, virtual meeting data from a plurality of user devices that have joined the virtual meeting; combining the virtual meeting data; and sending the combined virtual meeting data to the user device. The method may further include determining a minimum number of recordings of the virtual meeting to be made; causing a first plurality of user devices to record the virtual meeting for a first predetermined time period; and after the first predetermined time period has ended, causing a second plurality of user devices to record the virtual meeting for a second predetermined time period, wherein the first plurality and second plurality each comprise a number of user devices that is equal to or greater than the minimum number. The method may further include adding a plurality of user devices to the virtual meeting, wherein virtual meeting data is shared between the plurality of user devices using a peer-to-peer networking protocol.

In one aspect, a computer implemented method may include determining, by a user device and during a virtual meeting hosted by a first host and administered in communication with one or more user devices that are connected via a first ad-hoc network, that the first host is unresponsive; receiving a request to become a second host of the virtual meeting; broadcasting a second ad-hoc network; and adding, via the second ad-hoc network, the one or more user devices to the virtual meeting. The request to become a second host may be received from the first host before the first host is determined to be unresponsive. The request may include virtual meeting information indicating the one or more user devices and the method may further include sending the virtual meeting information to a server; and in response to sending the virtual meeting information to the server, receiving one or more requests from the one or more user devices to connect via the second ad-hoc network.

The method may further include disconnecting, by the user device, from the first host; and indicating, by the user device, to a server that the first host is unresponsive, wherein the request to become a second host is received, by the user device, from the server. Adding the one or more user devices to the virtual meeting may include sending, by the user device and via a connection with a server and to the one or more user devices, a request to join the virtual meeting, wherein the sending is based on virtual meeting information usable to identify the one or more user devices. The virtual meeting information may be received from the first host before the first host is determined to be unresponsive. The virtual meeting information may be received from the server via a third network. The receiving a request to become a second host of the virtual meeting may occur prior to joining the virtual meeting.

In other aspects, a system may be configured to perform one or more aspects and/or methods described herein. In some aspects, an apparatus may be configured to perform one or more aspects and/or methods described herein. In some aspects, one or more computer readable media may store computer executed instructions that, when executed, configure a system to perform one or more aspects and/or methods described herein.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
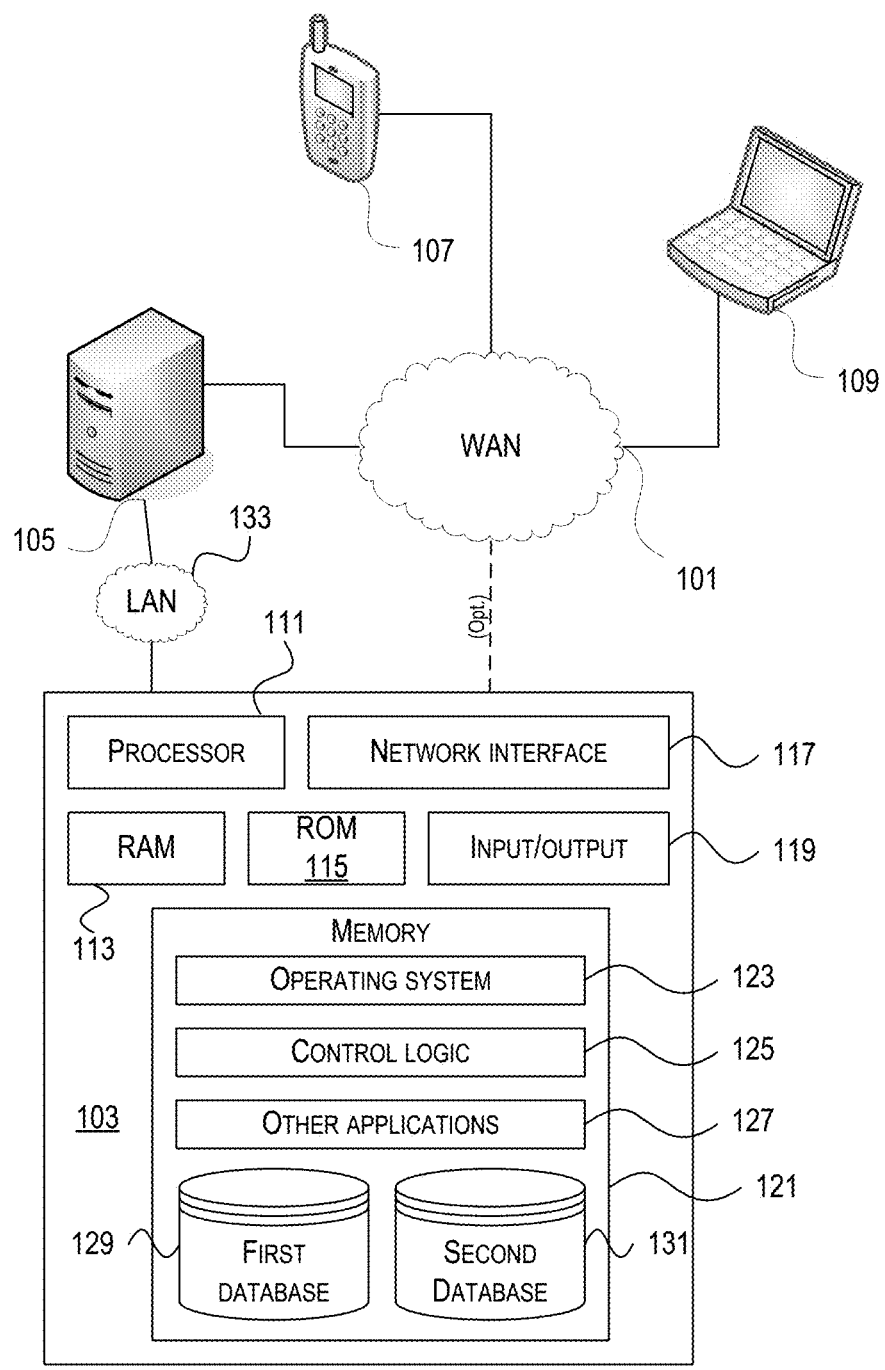
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards conducting virtual meetings using a plurality of devices. A host device configured to host a virtual meeting may receive information used to set up the virtual meeting from a computing device (e.g., a server). One or more user devices may receive information from the computing device to enable them to join the virtual meeting. The host device may establish a network (e.g., an ad-hoc network) that one or more user devices may join to participate in the virtual meeting. An ad-hoc network may include one or more devices that send data directly to each other without any intervening networking infrastructure. The one or more user devices may be directly connected to the host device so that data for the virtual meeting need only travel directly between the one or more user devices and the host device with no intermediary devices. This may enable user devices to connect to the host device and participate in the virtual meeting even if the user device has no Internet access or restricted Internet access. This may also enable participants to share large files and record meetings locally without data traveling over Internet network infrastructure. This may also reduce the likelihood of data loss because the data may need to travel one hop (e.g., from user device to host device and/or from host device to user device) to reach the intended destination. The host device may relay virtual meeting data among the one or more user devices that are participating in the virtual meeting. The host device may also split meeting recording responsibilities among the participating user devices to allow redundant recordings and/or to spread the burden of recording among multiple devices.

During a virtual meeting, host responsibilities may be transferred from the host device to one of the user devices participating in the virtual meeting or to a new user device that is joining the meeting. The host device may choose one of the user devices to become the new host. If the host device becomes unresponsive, a computing device (e.g., a server) may choose a new host device from the user devices and may send meeting information necessary to continue the virtual meeting to the new host device and user devices participating in the virtual meeting. Additionally/alternatively, secondary hosts may be determined prior to starting the virtual meeting to become the new host device if the original host device becomes unresponsive.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
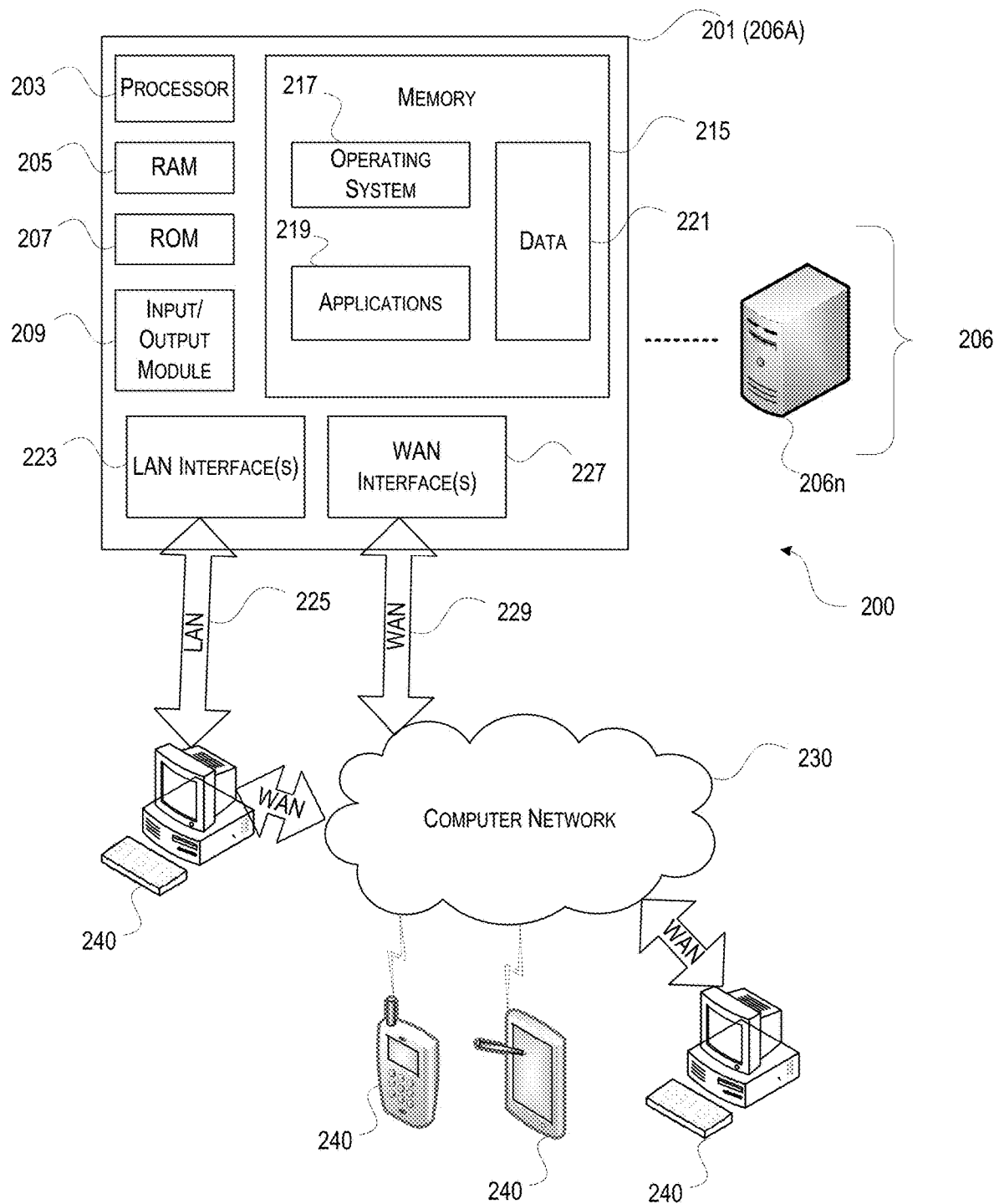
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Virtual Meetings in Ad-Hoc Networks

Figure 3:
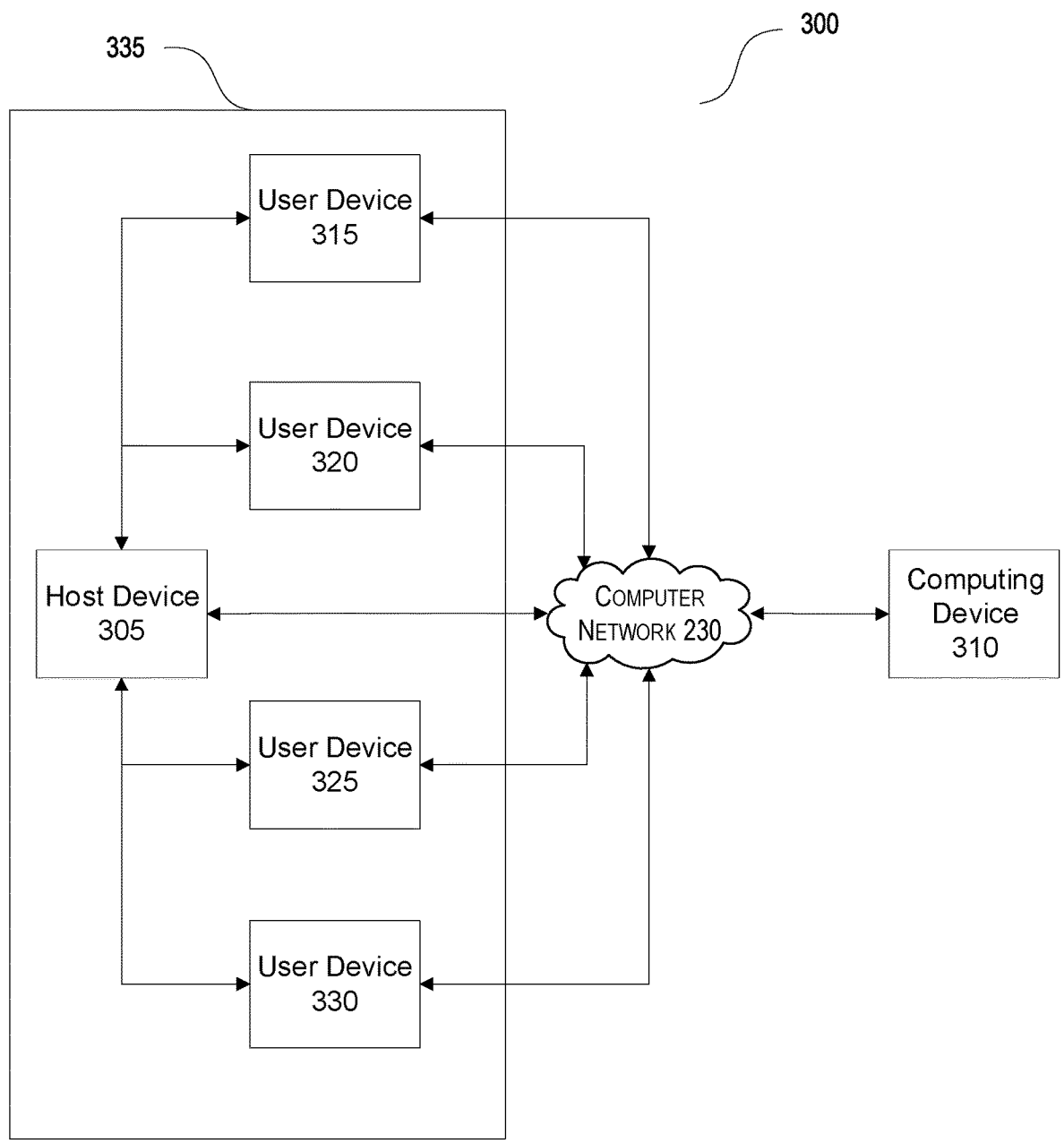
FIG. 3 depicts an illustrative system for conducting a virtual meeting and may be used in accordance with one or more illustrative aspects described herein.

FIG. 3 depicts an illustrative system 300 for conducting virtual meetings in a network. A virtual meeting may be used to exchange any form of communication (e.g., text messages, voice, video, sharing documents, etc.) between two or more devices. A virtual meeting may allow multiple user devices to share data without being physically located in the same location (e.g., without being in the same room, building, etc.). A virtual meeting may include a host device 305, and one or more user devices (e.g., user devices 315-330). The host device 305 and the user devices 315-330 may be connected via an ad-hoc network 335. The ad-hoc network 335 may be a peer-to-peer network and the virtual meeting may be a peer-to-peer virtual meeting. Although only four user devices are shown in FIG. 3, any number of user devices may be connected to the ad-hoc network 335 and may participate in a virtual meeting.

The host device 305 and the user devices 315-330 may be connected to a computing device 310. The computing device 310 may be the data server 103, web server 105, server 206a, or any other computing device. The host device 305 and user devices 315-330 may be connected to each other via the ad-hoc network 335 and be connected to the computing device 310 at the same time. Alternatively, each device may connect to either the ad-hoc network 335 or to the computing device 310 via computer network 230 one at a time. The host device 305 and user devices 315-330 may connect to the computing device to receive information to start a virtual meeting (as discussed in more detail below in connection with FIGS. 4-5 below). The host device 305 and user devices 315-330 may disconnect from the computing device 310 to participate in the virtual meeting, using the ad-hoc network 335 to exchange data (as discussed in more detail below).

The host device 305, user devices 315-330, and/or computing device 310 may be a smartphone, personal digital assistant, voice recognition assistant, laptop computer, tablet computer, desktop computer, smart home device, infotainment head unit of a vehicle, server or any other type of device. Host device 305, user devices 315-330, and/or computing device 310 may be terminals 240 and/or may include any component discussed in connection with data server 103 or server 206a.

The host device 305 and the user devices 315-330 may be connected using any connection method (e.g., using radio including 4G Long-Term Evolution or 5G New Radio, Bluetooth, Wi-Fi hotspot, wired connections, etc.). For example, the host device 305 may broadcast a Wi-Fi connection to user devices 315-330 to connect to. As an additional example, the host device 305 may connect directly to user devices 315-330 using 5G New Radio's device-to-device communication, which may enable devices to directly communicate without using any network infrastructure.

Different virtual meetings may be established with different settings or modes. For example, a virtual meeting may be established in a public mode where any device may join the virtual meeting if the device has the meeting ID. Public mode is explained in more detail below in connection with FIG. 4. A virtual meeting may be established in a private mode where only devices that are validated by the host device may be able to join the virtual meeting. Private mode is explained in more detail below in connection with FIG. 5.

A virtual meeting may be established in an offline mode. This mode may be helpful when the Internet connection is not available or an Internet connection is highly restricted. In offline mode, the host device 305 and user devices 315-330 may avoid or be unable to communicate with computing device 310. The host device 305 may broadcast an ad-hoc network. Devices that are within range of the host device 305 may join the ad-hoc network and may exchange data in a virtual meeting as explained below in connection with FIG. 6. If a host device becomes unresponsive in offline mode, a new host may be determined as discussed below in connection with FIG. 8 (e.g., steps 865 and 870).

The host device 305 may allow legitimate users to join a virtual meeting in offline mode but may prevent unrecognized user devices from joining the virtual meeting. The host device 305 may verify each user device that joins the virtual meeting in offline mode. For example, the host device 305 may have a list of user devices with corresponding device IDs (e.g., MAC address, Internet Protocol Address, etc.) that are part of the same organization to which the host device 305 belongs. When a user device attempts to join the virtual meeting, the host device 305 may compare the user device's MAC address with the list of user devices. If the user device's MAC address is found on the list, the host device 305 may allow the user device to join the virtual meeting.

Figure 4:
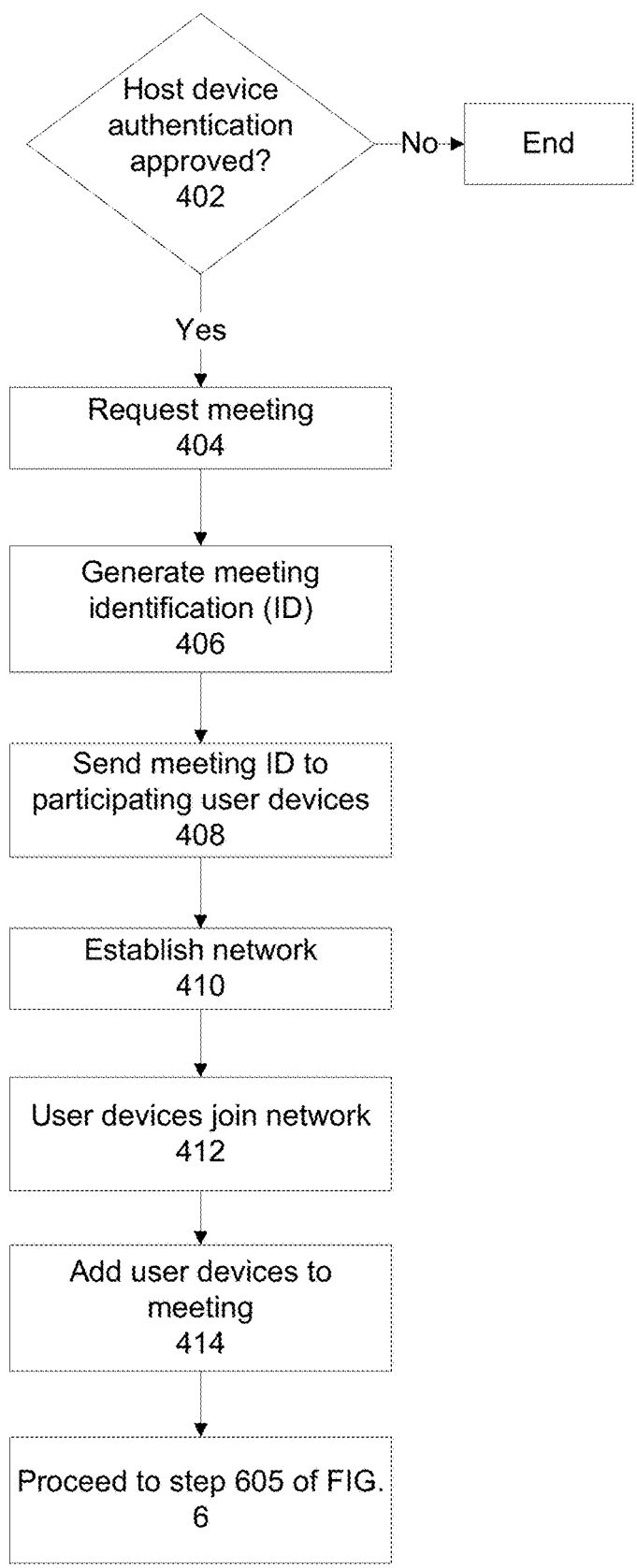
FIG. 4 depicts an illustrative method for establishing a virtual meeting and may be used in accordance with one or more illustrative aspects described herein.
Figure 5:
FIG. 5 depicts an illustrative method for establishing a virtual meeting and may be used in accordance with one or more illustrative aspects described herein.

FIGS. 4 and 5 show example methods and/or algorithms for establishing virtual meetings. FIG. 4 shows an example method for establishing a virtual meeting in public mode. In public mode, a virtual meeting may be joined by any device that has access to a meeting identification (ID). In public mode, the host device 305 may allow each user device with the meeting ID to join the virtual meeting without verifying the user device. One, some, or all steps in FIG. 4 may be performed by one or more devices including host device 305, computing device 310, and/or user devices 315-330. One or more steps of the example method of FIG. 4 may be rearranged, modified, repeated, and/or omitted.

At step 402 the host device 305 may authenticate itself to the computing device 310. The host device 305 may authenticate prior to starting a virtual meeting. For example, the host device 305 may log in to a web page operated by computing device 310. If the host device is authenticated by computing device 310, step 404 may be performed. If the host device is not authenticated, the example method of FIG. 4 may end.

At step 404, the host device 305 may send a request for a virtual meeting to the computing device 310. The request may indicate what type of virtual meeting is desired. For example, the host device 305 may request a public meeting that any device that has the meeting ID may join. For example, the host device 305 may request a private meeting that only particular user devices or users may join (as discussed in more detail in connection with FIG. 5). At step 406, the computing device 310 may generate a meeting identification (ID) for the virtual meeting that the host device 305 requested. The meeting ID may be a unique identifier for the virtual meeting.

At step 408, the meeting ID may be sent to one or more user devices that are to participate in a virtual meeting (e.g., user devices 315-330). For example, the computing device 310 may send the meeting ID to the host device 305 and the host device 305 may then send the meeting ID to the appropriate user devices. In this example, a user of the host device 305 may determine which devices or users should participate in the meeting. The meeting ID may be sent using any communication method (e.g., any method using the Internet such as email or text chat, via a phone call, etc.). Additionally/alternatively, the computing device 310 may send the meeting ID that was generated in step 406 directly to user devices 315-330. For example, the host device 305 may have indicated a number of user devices to invite to a virtual meeting when the host device 305 requested a virtual meeting. A user of the host device 305 may have an account maintained by the computing device 310 that has a list of users and/or user devices that are part of the same organization as the user of the host device 305. The host device 305 may be used to select, from the list, user devices to participate in the virtual meeting. After generating the meeting ID, the computing device 310 may send the meeting ID to user devices indicated by the host device 305.

At step 410, the host device 305 may establish a network. The network may be an ad-hoc network that is broadcasted locally. For example, the host device 305 may use a Wi-Fi protocol to broadcast the network to nearby devices. The host device 305 may establish a network using any type of wireless protocol (e.g., 4G Long-Term Evolution, 5G New Radio, Bluetooth, etc.). The host device 305 may broadcast the network and identify the network using the meeting ID generated in step 406 as the network name. Prior to broadcasting the network, the host device 305 may disconnect from any Internet connection it has (e.g., from any Wi-Fi access point and/or cellular network). Additionally/alternatively the host device 305 may establish a network using wired connections. The network established by the host device 305 may allow the user devices 315-330 to connect directly to the host device 305. The network may allow the host device 305 and the user devices 315-330 to send data to each other without using Internet networking infrastructure such as routers, firewalls, switches, servers, load-balancers, intrusion detection systems, storage area networks, etc. Data sent over the network may need to travel only one hop (e.g., from the host device to the user device, or from the user device to the host device) to reach its destination. The data sent over the network may need to travel only two hops (e.g., from a user device to the host device, and then from the host device to a second user device) to reach its destination.

At step 412, the user devices 315-330 may join the network established by the host device 305 in step 410. For example, the user devices 315-330 may connect to a Wi-Fi network that the host device 305 is broadcasting. At step 414, the host device 305 may add user devices 315-330 to a virtual meeting. Any user device that is able to provide the meeting ID to the host device may be added to the virtual meeting. The devices participating in the virtual meeting may exchange data as described below in connection with FIG. 6.

FIG. 5 shows an example method for establishing a virtual meeting in a private mode. In private mode, the host device 305 may allow only approved user devices and/or users to participate in the virtual meeting. As explained in more detail below, the host device 305 may specify which users and/or user devices may participate in the virtual meeting before the meeting begins. One, some, or all of such steps may be performed by one or more devices including host device 305, computing device 310, and/or user devices 315-330. One or more steps of the example method of FIG. 5 may be rearranged, modified, repeated, and/or omitted.

At step, 505, the computing device 310 may authenticate the host device 305 as discussed above in step 402 of FIG. 4. At step 510, the host device 305 may request a meeting as discussed above in step 404 of FIG. 4. The host device 305 may indicate to the computing device 310 the type of virtual meeting that is desired. For example, the host device 305 may indicate that the virtual meeting is to be in private mode.

At step 515, the host device 305 may identify a number of user devices to participate in a virtual meeting. The computing device 310 may provide a list of users and or user devices that are part of the same organization of the user of the host device 305. The user of the host device 305 may select one or more users from the list to participate in the virtual meeting. The host device 305 may indicate user devices by providing an ID of each user device to the host device 305 (e.g., MAC addresses, IP addresses, unique telephony numbers (International Mobile Equipment Identity, Mobile Equipment Identifier, Electronic Serial Number, International Mobile Subscriber Identity, etc.), a Subscriber Identity Module (SIM) card's unique integrated circuit card identifier (ICCID), serial number that identifies the device) and/or by selecting the IDs from a list provided by host device 305.

The host device 305 may indicate whether user devices not specified may be allowed to join the meeting (e.g., join the meeting after it has begun). For some virtual meetings, the host device 305 may indicate to the computing device 310 that only the user devices specified in step 515 may be allowed to join the virtual meeting. For example, the host device 305 may identify user device 315, 320, and 325 as participants of the meeting. After user devices 315, 320, and 325 have joined the virtual meeting, the host device 305 may cease to broadcast the network and the virtual meeting may be closed to additional user devices.

For some virtual meetings, the host device 305 may indicate to the computing device 310 that additional user devices beyond those specified in step 515 of FIG. 5 may be allowed to join the meeting (e.g., after the meeting has begun additional user devices may be able to join). The additional user devices may be unknown to the host device 305 prior to the start of the meeting. By indicating to the computing device 310 whether additional user devices may join the virtual meeting, the computing device 310 may be able to generate tokens (as discussed below in connection with steps 520-565) to be used to validate the additional user devices when they are determined.

At step 520, the computing device may generate a meeting ID and tokens for user devices to participate in the virtual meeting. The meeting ID may be generated as discussed above in step 406 of FIG. 4. The tokens may be generated by the computing device 310 using any signing algorithm (e.g., by using Rivest-Shamir-Adleman (RSA) in combination with Secure Hash Algorithms (SHA)). The tokens may be used to verify a user device to the host device as discussed below in step 540. A unique token may be generated for each user device that is identified in step 515. Each user device may be mapped to a unique token. For example, the tokens may be identified as key value pairs where the user device is the key and the token is the value.

The computing device 310 may generate additional tokens for additional user devices that are not identified in step 515. For example, the host device 305 may request that the additional tokens initially have no user device mapped to them. A user device may be mapped to one of the additional tokens later (e.g., after the virtual meeting has started) as additional user devices try to join the virtual meeting (as discussed in more detail in steps 555-565 below).

At step 525, the computing device 310 may send meeting information to the participating user devices and/or the host device 305. The meeting information may include the tokens generated and meeting ID generated in step 520. The meeting information may include other meeting details such as a start time of the meeting, agenda, topics to be discussed, documents that will be shared, and/or a duration of the meeting. Each user device may receive its respective token and the meeting ID and other meeting details. The host device 305 may receive all of the tokens (e.g., all tokens for each user and tokens that have no user device mapped to them), the meeting ID, and any other meeting information described above. The host device 305 may receive each token so that it can verify each user device when it attempts to join the virtual meeting. The meeting information may be sent using an Internet connection with the computing device 310 via network 230.

At step 530, the host device 305 may establish a network as discussed above in connection with step 410 of FIG. 4. At step 535, one or more user devices may join the network established by the host device 305 as discussed above in connection with step 412 of FIG. 4. As part of step 535, any number (e.g., 5, 30, 100, 2000, etc.) of user devices may join the network.

At step 540, the host device 305 may receive a token from one or more user devices to validate each of the one or more user devices. The host device 305 may compare the token received from the user device with the tokens received from the computing device 310 in step 525. If a token received from a user device matches a token and user device pair received from the computing device 310, the host device may validate the user device and allow it to join the virtual meeting. If the token received from a user device does not match a token and user device pair received from the computing device 310, the host device 305 may determine that the user device is not validated and may prevent the user device from joining the virtual meeting. If the token is validated, the host device 305 may grant the requesting user device access to the virtual meeting in step 545. If the token is not validated, the host device 305 may deny the requesting user device access to the virtual meeting in step 550.

At step 555, whether additional user devices may be added to the virtual meeting may be determined. The additional user devices may be user devices that were not specified by the host device 305 in step 515 above. For example, during the virtual meeting, the host device 305 may specify additional user devices to add to the meeting. The host device may communicate the additional user devices to computing device 310. The computing device 310 may map the extra tokens to the specified additional user devices to create additional token and user device pairs. Alternatively, the host device may allow any additional user device that has access to the meeting ID to join the virtual meeting.

If it is determined that additional user devices should be added to the virtual meeting, the additional participants may be determined in step 560. The host device 305 may send information identifying the additional user devices to the computing device 310. The computing device 310 may associate the user devices with the extra tokens generated in step 520.

At step 565, the computing device 310 may send the extra token(s) to the additional participating user devices. Each user device may receive its own respective token. Each extra token may also be sent to the host device 305 to allow it to verify each user device that tries to join the virtual meeting. Steps 535-550 may be repeated for each additional user device that tries to join the virtual meeting.

If it is determined that no additional user devices should be added to the virtual meeting, step 570 may be performed. At step 570, the host device 305 may stop broadcasting the network that was established in step 530. For example, the host device 305 may stop broadcasting a Wi-Fi network publicly to devices that are not connected to the host device 305. The host device 305 may cease broadcasting the network so that only devices that have already connected to the network may be able to participate in the virtual meeting. The devices participating in the virtual meeting may exchange data as described below in connection with FIG. 6.

Figure 6:
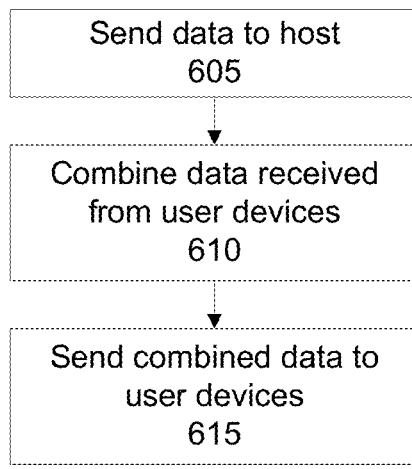
FIG. 6 depicts an illustrative method for sharing data among devices in a virtual meeting and may be used in accordance with one or more illustrative aspects described herein.

FIG. 6 illustrates an example method and/or algorithm for communicating within a virtual meeting. One, some, or all steps of FIG. 6 may be performed by one or more devices including host device 305 and/or user devices 315-330. One or more steps of the example method of FIG. 6 may be rearranged, modified, repeated, and/or omitted.

At step 605, one or more user devices (e.g., user devices 315-330) may send virtual meeting data to the host device 305. The virtual meeting data may be any type of data. For example, the virtual meeting data may include audio that is recorded at a user device (e.g., someone speaking during the virtual meeting). The virtual meeting data may include video, documents, text message, and/or any other type of data. The data may be received by the host device 305 via an ad-hoc network that is established by the host device 305 as discussed above.

At step 610, the host device may combine data received from user devices. For example, if multiple people are speaking and the host device receives audio data from multiple user devices, the host device may combine the audio data. The host device 305 may use any technique for synchronizing audio, video, or any other type of data to combine the data received from the user devices.

At step 615, the host device 305 may send the data combined in step 504 to user devices that are participating in the virtual meeting. The data may be sent via a network (e.g., an ad-hoc network) established as discussed above in connection with step 410 of FIG. 4 and/or step 530 of FIG. 5. The combined data may be shared with the user devices using peer-to-peer communication protocols. For example, user devices that have received packets or portions of packets may broadcast to each other what portions of the data they have received. The user devices may then share data they have received with user devices that have not received the data. For example, there may be four user devices 315-330 that are participating in the virtual meeting. A packet of virtual meeting data may be broken into three pieces. At one point in time, user device 315 may receive the third piece of the packet but may lack the first and second pieces of the packet. The user device 320 may receive the first piece of the packet and may broadcast that it has the first piece of the packet. The user device 315 may receive the broadcast from user device 320 and may request the first piece from the user device 320. The user device 320 may send the first piece of the packet to the user device 315.

Figure 7:
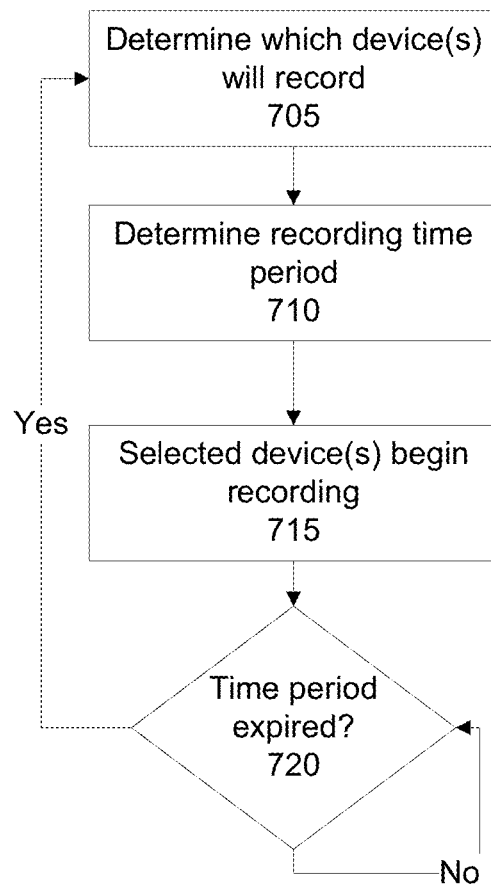
FIG. 7 depicts an illustrative method for recording a virtual meeting and may be used in accordance with one or more illustrative aspects described herein.

FIG. 7 illustrates an example method and/or algorithm for recording virtual meetings. One, some, or all steps of FIG. 7 may be performed by one or more devices including host device 305 and/or user devices 315-330. One or more steps of the example method of FIG. 7 may be rearranged, modified, repeated, and/or omitted.

At step 705, it may be determined which device(s) will record the virtual meeting. For example, the host device 305 may determine which user devices may record the meeting. Alternatively, the computing device 310 may determine which devices will record the meeting before a virtual meeting starts (e.g., step 406 of FIG. 4, or step 520 of FIG. 5). The host device 305 may determine to record the meeting itself and/or may determine that any number of participating user devices may record some or all of the virtual meeting. Any part of the virtual meeting may be recorded including video, audio, documents that are shared among the devices, text chat, etc.

Multiple devices may record the virtual meeting. For example, two or more devices may record a portion of, or the entire virtual meeting. Any number of devices (e.g., 6 devices, 3 devices, half of the devices, one quarter of the devices, etc.) may be selected to assist with recording the virtual meeting. For example, all devices that are participating in the virtual meeting may record all or a portion of the virtual meeting.

At step 710, a recording time period may be determined. The recording time period may be used to divide the task of recording the virtual meeting among multiple devices. In some virtual meetings, the host device 305 and/or computing device 310 may determine to distribute the work of recording to not overburden any one device. One or more devices may record for the time period and then may stop recording. Dividing the task of recording may enable the devices that are participating in the virtual meeting to better manage memory resources.

Devices may record the virtual meeting in a round robin fashion. For example, a first group of devices that are selected to record the virtual meeting may record for the duration of the time period and then may stop recording. A second group of devices may begin recording when the first group stops recording the virtual meeting. The second group of devices may record until a second time period expires, at which point a third group of devices may begin recording. Different groups of devices may continue to switch between recording and not recording until the virtual meeting has completed.

At step 715, any device that has been selected to record the virtual meeting may begin recording. The recording device may begin recording when the virtual meeting begins. At step 720, whether the time period has expired may be determined. The host device 305 and/or one or more user devices may determine whether the time period has expired. If the time period has expired and the virtual meeting is not over, step 705 may be performed (the steps in FIG. 7 may be repeated). If the time period has expired and the virtual meeting is over, all devices may stop recording. If the time period has not expired the devices that are recording may continue recording until the time period has expired.

For example, the host device 305 may determine (e.g., based on input from a user of the host device 305) that three copies of the virtual meeting should be recorded. The host device 305 may also determine that each device should record for 15 minutes (i.e. the recording time period) before recording responsibilities are transferred to another device. The host device may determine that user devices 315, 320, and 325 should record for the first 15 minutes of the meeting and that the devices should rotate recording responsibilities. For example, the second 15 minutes may be recorded by user devices 320, 325, and 330. The third 15 minutes of the virtual meeting may be recorded by user devices 325, 330, and 315, and so on. The host device 305 may send a message to each device causing them to record the virtual meeting in a rotating manner as described.

Figure 8:
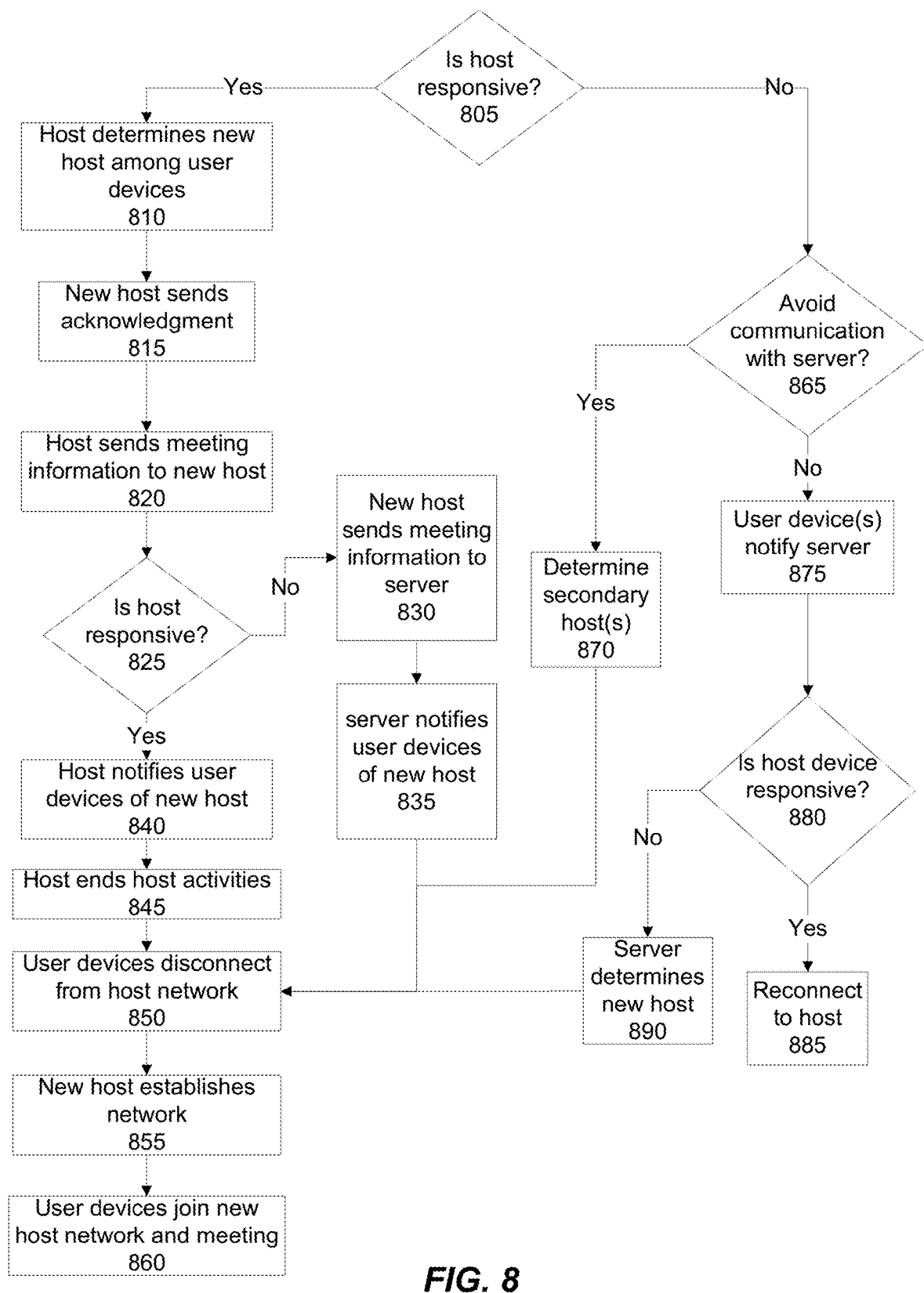
FIG. 8 depicts an illustrative method for changing the host of a virtual meeting and may be used in accordance with one or more illustrative aspects described herein.

FIG. 8 illustrates an example method and/or algorithm for changing the host device of a virtual meeting. The host device may need to change in the middle of a virtual meeting. For example, the host device of a virtual meeting may need to leave the meeting or may be unable to continue hosting the meeting. The host device may crash, shut down, restart, or otherwise have a problem while hosting the virtual meeting. The host may change intentionally (e.g., where the host device needs to leave the meeting) or the host device may need to change unintentionally (e.g., the host device becomes unresponsive during the meeting and no longer performs the responsibilities of the host device). The steps in FIG. 8 may occur after a virtual meeting has been established and may be performed after one or more steps of FIGS. 4, 5, 6, and/or 7 have been performed. One, some, or all steps of FIG. 8 may be performed by one or more devices including host device 305, computing device 310, and/or user devices 315-330. One or more steps of the example method of FIG. 8 may be rearranged, modified, repeated, and/or omitted.

At step 805, a user device (e.g., user device 315-330) may determine whether the host is responsive. The user device may periodically (e.g., every 500 ms, every 60 seconds, etc.) exchange heartbeat messages with the host device. If the host device fails to respond within a predetermined time frame (e.g., within 500 milliseconds, 5 seconds, 60 seconds, etc.) the user device may determine that the host device is unresponsive. Additionally/alternatively, the user device may determine that the host device is unresponsive if the host device fails to send virtual meeting data within a predetermined time frame (e.g., within every 500 milliseconds, 5 seconds, 60 seconds, etc.). If the host sends virtual meeting data within the predetermined time period, the user device may determine that the host device is responsive. If the host device sends a heartbeat message within the predetermined time period then the user device may determine that the host device is responsive.

If it is determined that the host is responsive in step 805, step 810 may be performed. At step 810, the host device may determine a new host device from the user devices that are participating in the virtual meeting. The host device may randomly select a user device from the user devices participating in the virtual meeting. Alternatively, the host device may receive signal strength information or location information from the user devices that are participating in the virtual meeting, and may determine a user device that is predicted to be able to establish a wireless connection with the other user devices based on the signal strength information or location information. For example, using location information from each of the user devices participating in the virtual meeting, the host device may select, to become the new host device, a user device that is located closest to the center of the user devices. At step 815, the new host may send an acknowledgment message indicating that it will become the new host to the host device.

At step 820, the host device may send meeting information to the new host device that was determined in step 810. The meeting information may include any meeting information discussed in connection with step 520 of FIG. 5. The meeting information may include identification information for other user devices that are participating in the virtual meeting. The ID information may include MAC addresses, IP addresses, unique telephony numbers (International Mobile Equipment Identity, Mobile Equipment Identifier, Electronic Serial Number, International Mobile Subscriber Identity, etc.), a Subscriber Identity Module (SIM) card's unique integrated circuit card identifier (ICCID), a serial number that identifies the device, or any other identification information. The meeting information may include identification of users that are participating in the virtual meeting.

At step 825, whether the host device is responsive may be determined. For example, the user device that has been selected as a new host may determine whether the host device is responsive as described above in step 805. If the host device is not responsive, then step 830 may be performed. If the host device is responsive then step 840 may be performed.

At step 830, the user device that was selected as the new host in step 810 may send the meeting information it received in step 820 to computing device 310. If the host device has become unresponsive, the new host may receive assistance from the computing device 310 to finish the transition to becoming the host of the virtual meeting. The computing device 310 may use the meeting information (e.g., the meeting ID, the user device IDs of the devices that are participating in the virtual meeting) to assist a user device in the transition to becoming the new host device.

At step 835, the computing device 310 may notify user devices that are participating in the virtual meeting of the new host device. For example, the computing device 310 may send instructions to the user devices to disconnect from the current host device and connect to the new host device. The computing device 310 may send, to the user devices, information that identifies the new host device (e.g., MAC address, IP address, unique telephony numbers (International Mobile Equipment Identity, Mobile Equipment Identifier, Electronic Serial Number, International Mobile Subscriber Identity, etc.), a Subscriber Identity Module (SIM) card's unique integrated circuit card identifier (ICCID), a serial number that identifies the device, or any other identification information). After the computing device 310 notifies the user devices, steps 850-860 may be performed as discussed below.

If the host device is determined to be responsive in step 825, step 840 may be performed, and the host device may notify user devices that are in the virtual meeting of the new host device that was determined in step 810. For example, the host device 305 may send instructions to the user devices to disconnect from the current host device and connect to the new host device. The host device 310 may send information that identifies the new host device (e.g., device ID, IP address, etc.) to enable the user devices to connect to the new host device. Alternatively/additionally, the user devices may wait for a network to be broadcasted that has the same name as the meeting ID for the virtual meeting they are participating in. If the devices detect a new network that uses the meeting ID as the network name, the devices may join the new network to continue the virtual meeting.

At step 845, the host device may end host activities. For example, the host device may stop transferring meeting data among user devices. The host device may cease broadcasting a network that is used for the virtual meeting and/or may disconnect from all user devices that are connected to it.

At step 850, the user devices may disconnect from the host device. This may enable the user devices to connect to the new host device determined in step 810. At step 855, the new host device may establish a network that is to be used in the virtual meeting. This step may be performed as described in step 410 of FIG. 4 or step 530 of FIG. 5. At step 860 user devices that were previously participating in the virtual meeting may join the network established by the new host and may continue the virtual meeting with the new host device. The new host device may validate each user device that joins the virtual meeting as discussed in FIG. 5 (e.g., steps 540-550).

If the host is determined to be unresponsive in step 805, step 865 may be performed. At step 865 whether communication with the server should be avoided may be determined. The meeting may have settings set by the host device prior to host device becoming unresponsive that indicate whether communication with computing device 310 should be avoided. A user device that is participating in the meeting may determine, based on the settings of the virtual meeting that it should not communicate with computing device 310. Additionally/alternatively, a user device may determine that it should not communicate with computing device 310 because of network conditions. For example, network conditions may be such that communicating with computing device 310 is not possible (e.g., due to low bandwidth, heavy traffic in the network, power outage, etc.).

At step 870, one or more secondary hosts may be determined by a user device. A secondary host may be determined based on meeting information that the user device received. The meeting information may indicate an ordering of secondary hosts to connect to if the original host becomes unresponsive. For example, user device 315 may have received information indicating user device 320, 325, and 330 as secondary hosts. The secondary host information may indicate that user device 320 should become the host if host device 305 becomes unresponsive, that the user device 325 should become the host if user device 320 becomes unresponsive, and that user device 330 should become the host if user device 325 becomes unresponsive. The secondary host information may have been received from computing device 310 or host device 305 before the virtual meeting began. The secondary host information may have been selected by a user of host device 305 or computing device 310. The secondary host information may have been determined based on information received from a user device indicating that it was willing to be a secondary host device. Each user device that is participating in the virtual meeting may have received the secondary host information and may determine the next secondary host that the user device should connect with to continue the virtual meeting. After determining the secondary host in step 870, steps 850-860 may be performed as described above with the secondary host acting as the new host.

If it is determined, at step 865, that communication with the computing device 310 does not need to be avoided, step 875 may be performed. At step 875, one or more user devices may notify the computing device 310 that the host device has become unresponsive. A user device may disconnect from a network established by the host device 305 to connect to a network that enables the user device to communicate with the computing device 310. Alternatively, a user device may maintain a connection with the network established by the host device 305 and may simultaneously connect to a second network that enables it to communicate with the computing device 310.

At step 880, the server may determine whether the host device is responsive. The server may send a message (e.g., a heartbeat message, a SYN packet, etc.) to the host device. If the host device replies to the computing device 310 (e.g., with a heartbeat message, an ACK packet, etc.), the computing device 310 may determine that the host device is responsive and the server may send instructions to the user device to reconnect to the host device. At step 885, the user device may reconnect to the host device to continue the virtual meeting.

If the computing device 310 determines that the host device is unresponsive in step 880, the computing device 310 may determine a new host device in step 890. The server may select a new host from the user devices that were participating in the virtual meeting before the host device became unresponsive. Alternatively, a user device may be selected as co-host before the virtual meeting begins and the computing device 310 may select the co-host as the new host. The server may have a list of user devices that were participating in the meeting and may select a user device from the list. Steps 850-860 may be performed as described above with the user device that was selected by the computing device 310 acting as the new host.

The following paragraphs (M1) through (M7) describe examples of methods that may be implemented in accordance with the present disclosure.

(M1) A method comprising receiving, by a host device and from a computing device, virtual meeting setup information comprising a meeting identification (ID) corresponding to a virtual meeting hosted by the host device; sending, by the host device via a first network and to a user device, the meeting ID; establishing an ad-hoc network comprising the host device and the user device, wherein the user device is directly connected to the host device; and adding, based on a determination that the user device has access to the meeting ID, the user device to the virtual meeting hosted by the host device.

(M2) A method may be performed as described in paragraph (M1) wherein sharing, by the host device, virtual meeting data with the user device via the ad-hoc network, wherein the virtual meeting data travels directly from the host device to the user device . . . .

(M3) A method may be performed as described in any of paragraphs (M1) through (M2), wherein the virtual meeting setup information further comprises a first token, the method further comprising: validating, based on a comparison of the first token and a second token received from the user device, the user device prior to adding the user device to the virtual meeting.

(M4) A method may be performed as described in any of paragraphs (M1) through (M3) wherein establishing the ad-hoc network comprises: broadcasting the ad-hoc network; and after adding the user device to the virtual meeting, ceasing to broadcast the ad-hoc network.

(M5) A method may be performed as described in any of paragraphs (M1) through (M4) further comprising: receiving, by the host device, virtual meeting data from a plurality of user devices that have joined the virtual meeting; combining the virtual meeting data; and sending the combined virtual meeting data to the user device.

(M6) A method may be performed as described in any of paragraphs (M1) through (M5) further comprising determining a minimum number of recordings of the virtual meeting to be made; causing a first plurality of user devices to record the virtual meeting for a first predetermined time period; and after the first predetermined time period has ended, causing a second plurality of user devices to record the virtual meeting for a second predetermined time period, wherein the first plurality and second plurality each comprise a number of user devices that is equal to or greater than the minimum number.

(M7) A method may be performed as described in any of paragraphs (M1) through (M6) further comprising adding a plurality of user devices to the virtual meeting, wherein virtual meeting data is shared between the plurality of user devices using a peer-to-peer networking protocol.

The following paragraphs (S8) through (S12) describe examples of systems that may be implemented in accordance with the present disclosure.

(S8) A system comprising one or more processors; and a memory storing computer-readable instructions that, when executed by the one or more processors, configure the one or more processors to: receive, from a computing device, virtual meeting setup information comprising a meeting identification (ID) corresponding to a virtual meeting hosted by the system; send, via a first network and to a user device, the meeting ID; establish an ad-hoc network comprising the system and the user device, wherein the user device is directly connected to system; and add, based on a determination that the user device has access to the meeting ID, the user device to the virtual meeting.

(S9) A system as described in (S8) wherein the instructions, when executed by the one or more processors, further configure the one or more processors to: share virtual meeting data with the user device via the ad-hoc network, wherein the virtual meeting data travels directly from the system to the user device.

(S10) A system as described in any of paragraphs (S8) through (S9) wherein the virtual meeting setup information further comprises a first token, wherein the instructions, when executed by the one or more processors, further configure the one or more processors to: validate, based on a comparison of the first token and a second token received from the user device, the user device prior to adding the user device to the virtual meeting.

(S11) A system as described in any of paragraphs (S8) through (S10) wherein establishing the ad-hoc network comprises: broadcasting the ad-hoc network; and after adding the user device to the virtual meeting, ceasing to broadcast the ad-hoc network.

(S12) A system as described in any of paragraphs (S8) through (S11) wherein the instructions, when executed by the one or more processors, further configure the one or more processors to: receive virtual meeting data from a plurality of user devices that have joined the virtual meeting; combine the virtual meeting data; and send the combined virtual meeting data to the user device.

The following paragraphs (M13) through (M20) describe examples of methods that may be implemented in accordance with the present disclosure.

(M13) A method comprising determining, by a user device and during a virtual meeting hosted by a first host and administered in communication with one or more user devices that are connected via a first ad-hoc network, that the first host is unresponsive; receiving a request to become a second host of the virtual meeting; broadcasting a second ad-hoc network; and adding, via the second ad-hoc network, the one or more user devices to the virtual meeting.

(M14) A method may be performed as described in paragraph (M13) wherein the request to become a second host is received from the first host before the first host is determined to be unresponsive.

(M15) A method may be performed as described in any of paragraphs (M13) through (M14) wherein the request comprises virtual meeting information indicating the one or more user devices, the method further comprising: sending the virtual meeting information to a server; and in response to sending the virtual meeting information to the server, receiving one or more requests from the one or more user devices to connect via the second ad-hoc network.

(M16) A method may be performed as described in any of paragraphs (M13) through (M15) further comprising disconnecting, by the user device, from the first host; and indicating, by the user device, to a server that the first host is unresponsive, wherein the request to become a second host is received, by the user device, from the server.

(M17) A method may be performed as described in any of paragraphs (M13) through (M16) wherein adding the one or more user devices to the virtual meeting comprises: sending, by the user device and via a connection with a server and to the one or more user devices, a request to join the virtual meeting, wherein the sending is based on virtual meeting information usable to identify the one or more user devices.

(M18) A method may be performed as described in paragraph (M17) wherein the virtual meeting information is received from the first host before the first host is determined to be unresponsive.

(M19) A method may be performed as described in paragraph (M17) wherein the virtual meeting information is received from the server via a third network.

(M20) A method may be performed as described in any of paragraphs (M13) through (M19) wherein the receiving a request to become a second host of the virtual meeting occurs prior to joining the virtual meeting.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a host device and from a computing device via a first network, virtual meeting setup information comprising a meeting identification (ID) corresponding to a virtual meeting hosted by the host device;
based on receiving the virtual meeting setup information, sending, by the host device and to a user device via the first network, the meeting ID;
based on receiving the virtual meeting setup information, establishing, by the host device and using a wireless protocol, a second network the user device is to connect to for participating in the virtual meeting by at least broadcasting, by the host device and using the wireless protocol, the second network to enable the user device to connect to the second network and participate in the virtual meeting, wherein the second network enables the host device and the user device to send data to each other in a single hop;
after the user device connects to the second network, receiving, by the host device and from the user device via the second network in the single hop, data associated with adding the user device to the virtual meeting;
based on the data associated with adding the user device to the virtual meeting, adding, by the host device, the user device to the virtual meeting;
based on a determination that no additional user devices are to be added to the virtual meeting, ceasing, by the host device, to broadcast the second network such that the host device and the user device are able to continue the virtual meeting by communicating via the second network; and
sending, by the host device and to the user device via the second network in the single hop, virtual meeting data for the virtual meeting.

2. The method of claim 1, wherein the virtual meeting data travels, via the second network, in the single hop from the host device to the user device and without using network infrastructure of the first network, wherein the first network is a wide-area network, and wherein the second network is an ad-hoc network.

3. The method of claim 1, wherein the virtual meeting setup information further comprises a first token, wherein the data associated with adding the user device to the virtual meeting comprises a second token, and wherein the method further comprises:
prior to adding the user device to the virtual meeting, validating, based on a comparison of the first token and the second token, the user device.

4. The method of claim 1, further comprising:
receiving, by the host device via the second network, a plurality of communications from a plurality of user devices that have joined the virtual meeting, wherein each of the plurality of communications includes additional virtual meeting data;
combining the additional virtual meeting data from each of the plurality of communications, resulting in combined virtual meeting data; and
sending the combined virtual meeting data to the user device.

5. The method of claim 1, further comprising:
determining a minimum number of recordings of the virtual meeting to be made;
causing a first plurality of user devices to record the virtual meeting for a first predetermined time period; and
after the first predetermined time period has ended, causing a second plurality of user devices to record the virtual meeting for a second predetermined time period, wherein the first plurality of user devices and the second plurality of user devices each comprise a number of user devices that is equal to or greater than the minimum number.

6. The method of claim 1, wherein broadcasting the second network is performed based on a network identity for the second network that comprises the meeting ID, and wherein broadcasting the second network based on the network identity for the second network enables the user device to identify the second network based on the meeting ID.

7. The method of claim 1, wherein the data associated with adding the user device to the virtual meeting comprises the meeting ID.

8. The method of claim 1, further comprising:
prior to broadcasting the second network, disconnecting, by the host device, from the first network.

9. An apparatus comprising:
one or more processors; and
memory storing computer-executable instructions that, when executed by the one or more processors, cause the apparatus to:
receive, from a computing device via a first network, virtual meeting setup information comprising a meeting identification (ID) corresponding to a virtual meeting hosted by the apparatus;
based on receiving the virtual meeting setup information, send, via a first network and to a user device, the meeting ID;
based on receiving the virtual meeting setup information, establish, using a wireless protocol, a second network the user device is to connect to for participating in the virtual meeting by at least broadcasting, using the wireless protocol, the second network to enable the user device to connect to the second network and participate in the virtual meeting, wherein the second network enables the apparatus and the user device to send data to each other in a single hop;
after the user device connects to the second network, receive, from the user device via the second network in the single hop, data associated with adding the user device to the virtual meeting;
based on the data associated with adding the user device to the virtual meeting, add the user device to the virtual meeting;
based on a determination that no additional user devices are to be added to the virtual meeting, cease broadcast of the second network such that the apparatus and the user device are able to continue the virtual meeting by communicating via the second network; and
send, to the user device via the second network in the single hop, virtual meeting data for the virtual meeting.

10. The apparatus of claim 9, wherein the virtual meeting data travels, via the second network, in the single hop from the apparatus to the user device and without using network infrastructure of the first network, wherein the first network is a wide-area network, and wherein the second network is an ad-hoc network.

11. The apparatus of claim 9, wherein the virtual meeting setup information further comprises a first token, wherein the data associated with adding the user device to the virtual meeting comprises a second token, wherein the computer-executable instructions, when executed by the one or more processors, cause the apparatus to:
prior to adding the user device to the virtual meeting, validate, based on a comparison of the first token and the second token, the user device.

12. The apparatus of claim 9, wherein the computer-executable instructions, when executed by the one or more processors, cause the apparatus to:
receive, via the second network, a plurality of communications from a plurality of user devices that have joined the virtual meeting, wherein each of the plurality of communications includes additional virtual meeting data;
combine the virtual meeting data from each of the plurality of communications, resulting in combined virtual meeting data; and
send the combined virtual meeting data to the user device.

13. The apparatus of claim 9, wherein the data associated with adding the user device to the virtual meeting comprises the meeting ID.

14. One or more non-transitory computer-readable media storing computer-executable instructions that, when executed, cause an apparatus to:
receive, from a computing device via a first network, virtual meeting setup information comprising a meeting identification (ID) corresponding to a virtual meeting hosted by the apparatus;
based on receiving the virtual meeting setup information, send, to a user device via the first network, the meeting ID;
based on receiving the virtual meeting setup information, establish, using a wireless protocol, a second network the user device is to connect to for participating in the virtual meeting by at least broadcasting, using the wireless protocol, the second network to enable the user device to connect to the second network and participate in the virtual meeting, wherein the second network enables the apparatus and the user device to send data to each other in a single hop;
after the user device connects to the second network, receive, from the user device via the second network in the single hop, data associated with adding the user device to the virtual meeting;
based on the data associated with adding the user device to the virtual meeting, add the user device to the virtual meeting;
based on a determination that no additional user devices are to be added to the virtual meeting, cease to broadcast the second network such that the apparatus and the user device are able to continue the virtual meeting by communicating via the second network; and
send, to the user device via the second network in the single hop, virtual meeting data for the virtual meeting.

15. The one or more non-transitory computer-readable media of claim 14, wherein the virtual meeting data travels, via the second network, in the single hop from the apparatus to the user device and without using network infrastructure of the first network, wherein the first network is a wide-area network, and wherein the second network is an ad-hoc network.

16. The one or more non-transitory computer-readable media of claim 14, wherein the virtual meeting setup information further comprises a first token, wherein the data associated with adding the user device to the virtual meeting comprises a second token, and wherein the computer-executable instructions, when executed, cause the apparatus to:
prior to adding the user device to the virtual meeting, validate, based on a comparison of the first token and the second token, the user device.

17. The one or more non-transitory computer-readable media of claim 14, wherein the computer-executable instructions, when executed, cause the apparatus to:
receive, via the second network, a plurality of communications from a plurality of user devices that have joined the virtual meeting, wherein each of the plurality of communications includes additional virtual meeting data;
combine the additional virtual meeting data from each of the plurality of communications, resulting in combined virtual meeting data; and
send the combined virtual meeting data to the user device.

18. The one or more non-transitory computer-readable media of claim 14, wherein the computer-executable instructions, when executed, cause the apparatus to:

determine a minimum number of recordings of the virtual meeting to be made;

cause a first plurality of user devices to record the virtual meeting for a first predetermined time period; and after the first predetermined time period has ended, cause a second plurality of user devices to record the virtual meeting for a second predetermined time period, wherein the first plurality of user devices and the second plurality of user devices each comprise a number of user devices that is equal to or greater than the minimum number.

19. The one or more non-transitory computer-readable media of claim 14, wherein the data associated with adding the user device to the virtual meeting comprises the meeting ID.

20. The one or more non-transitory computer-readable media of claim 14, wherein the executable instructions, when executed, cause the apparatus to:

prior to broadcasting the second network, disconnect from the first network.

\* \* \* \* \*